(12) United States Patent
Coleman

(10) Patent No.: US 8,301,657 B1
(45) Date of Patent: Oct. 30, 2012

(54) SET-LEVEL DATABASE ACCESS FOR PERFORMING ROW-SEQUENTIAL OPERATIONS

(75) Inventor: George J. Coleman, Corvallis, OR (US)

(73) Assignee: Teradata US, Inc., Dayton, OH (US)

( * ) Notice: Subject to any disclaimer, the term of this patent is extended or adjusted under 35 U.S.C. 154(b) by 2419 days.

(21) Appl. No.: 10/142,109

(22) Filed: May 9, 2002

(51) Int. Cl.
 *G06F 17/30* (2006.01)
(52) U.S. Cl. ........................................ 707/781
(58) Field of Classification Search .............. 707/1–10, 707/100–104.1, 200–205
 See application file for complete search history.

(56) References Cited

U.S. PATENT DOCUMENTS

| | | | | |
|---|---|---|---|---|
| 5,253,361 A | * | 10/1993 | Thurman et al. | 707/3 |
| 5,706,494 A | * | 1/1998 | Cochrane et al. | 707/2 |
| 5,826,270 A | * | 10/1998 | Rutkowski et al. | 707/10 |
| 5,842,197 A | * | 11/1998 | Ho | 707/2 |
| 5,963,934 A | * | 10/1999 | Cochrane et al. | 707/2 |
| 6,044,216 A | * | 3/2000 | Bhargava et al. | 717/114 |
| 6,226,649 B1 | * | 5/2001 | Bodamer et al. | 707/104.1 |
| 6,411,951 B1 | * | 6/2002 | Galindo-Legaria et al. | 707/3 |
| 6,467,079 B1 | * | 10/2002 | Ettritch et al. | 717/108 |
| 6,581,052 B1 | * | 6/2003 | Slutz | 707/2 |
| 6,598,041 B1 | * | 7/2003 | Bernal et al. | 707/3 |
| 6,704,747 B1 | * | 3/2004 | Fong | 707/104.1 |
| 6,725,230 B2 | * | 4/2004 | Ruth et al. | 707/102 |
| 2003/0226132 A1 | * | 12/2003 | Tondreau et al. | 717/116 |

* cited by examiner

*Primary Examiner* — Syling Yen
(74) *Attorney, Agent, or Firm* — Howard Speight

(57) ABSTRACT

A method and computer program are disclosed for increasing the efficiency of a row sequential database operation by transforming procedural logic, which applies serially to one row at a time, into set logic, which applies in parallel to many rows or all rows at once. The method includes dividing the row sequential operation into a plurality of portions. A hierarchy is determined for the portions. A set level operation is generated in accordance with the portion hierarchy.

28 Claims, 12 Drawing Sheets

| Row Sequential Functions | Set Level Functions |
| --- | --- |
| to_date(s,f) | CAST( s AS DATE\|TIMESTAMP (FORMAT f) ) |
| to_char(v,f) | CAST( v AS CHAR(...) [(FORMAT f)] ) or |
| | CAST( CAST( v AS (FORMAT f) AS CHAR(...) ) ) |
| to_num[ber](s,f) | CAST( s AS NUMERIC [(FORMAT f ) ] |
| nvl(m,n) | COALESCE(m,n) |
| decode(a,b,c,...,d) | CASE a WHEN b THEN c [WHEN ... THEN ...] [ELSE d] END |
| lpad(s,n) | CAST( s AS CHAR(n ) ) |
| ltrim(s,c) | TRIM( LEADING c FROM s ) |
| rtrim(s,c) | TRIM( TRAILING c FROM s ) |
| ltrim(rtrim(s,c),c) | TRIM( BOTH c FROM s ) |
| trunc(d,f) | CAST( d AS DATE FORMAT f ) |
| length(s) | CHAR_LENGTH(s) |
| instr(s,c) | INDEX(s,c) |

*FIG. 8*

Row Sequential Operation

...

cursor a is select Amt, D_date, AcctNum from Deposits where AcctNum = acct_num;
cursor b is select * from Accts;

```
begin
    for acct_rec in b loop begin
        acct_num := to_char(acct_rec.AcctNum,'9(9)');
                fetch a into amount, ddate, acct;
                if ddate is null then ddate := sysdate; end if;
                if amount > 0 then
                        insert into MyDeposits (amount, ddate, acct, name)
                                values (amount, ddate, acct, acct_rec.name);
                else
                        insert into NullDeposits (amount, ddate, acct, name)
                                values (amount, ddate, acct, acct_rec.name);
                end if;
    end loop;
end;
```

FIG. 9

Corresponding Set Level Operation insert into MyDeposits ( amount , ddate , acct , name )

SELECT ( A.Amt , CASE WHEN (A.D_date) is null THEN DATE ELSE A.D_date END , A.AcctNum , B.name )

FROM ( select Amt , D_date , AcctNum from Deposits where AcctNum = cast(cast(B.AcctNum as (format '9(9)')) as char(9)) ) A ,( select * from Accts ) B WHERE (A.Amt) > 0

;

insert into NullDeposits ( amount , ddate , acct , name )

SELECT ( A.Amt , CASE WHEN (A.D_date) is null THEN DATE ELSE A.D_date END , A.AcctNum , B.name )

FROM ( select Amt , D_date , AcctNum from Deposits where AcctNum = cast(cast(B.AcctNum as (format '9(9)')) as char(9)) ) A ,( select * from Accts ) B WHERE NOT ( (A.Amt) > 0 )

Row Sequential Operation

```
cursor DEP is select Amt, D_date, AcctNum from Deposits;
begin
        for Deposits_Rec in DEP loop
                acct_num := Deposits_Rec.AcctNum;
                if acct_num = '999999990' then
                        GL_Acct := 'SLUSH';
                elsif acct_num = '999999991' then
                        GL_Acct := 'MY SWISS BANK';
                elsif acct_num = '999999992' then
                        GL_Acct := 'BLDG FUND';
                else
                        GL_Acct := 'CUST DEPOSIT';
                end if;
                insert into Gen_Ledger (Amount, Acct, DDate)
                        values(Deposits_rec.Amt, GL_Acct,
                                        Deposits_rec.D_date);
        end loop;
end;
```

FIG. 11

Set Level Operation
INSERT INTO Gen_Ledger ( Amount , Acct , DDate )
SELECT
    DEP.Amt
    , CASE WHEN DEP.AcctNum = '999999990'  THEN 'SLUSH'
        WHEN DEP.AcctNum = '999999991' THEN 'MY SWISS BANK'
        WHEN DEP.AcctNum = '999999992' THEN 'BLDG FUND'
        ELSE 'CUST DEPOSIT'
        END
    , DEP.D_date
FROM Deposits DEP
;

FIG. 12

Row Sequential Operation acct_bal number(9,2);

acct_num char(9);

cursor TXN_CUR is select Amt, AcctNum from Acct_Transactions
    where AcctNum = acct_num;

cursor ACCT_CUR is select AcctNum, acct_balance from Accts;

begin
    for acct_rec in ACCT_CUR loop
        acct_num := acct_rec.AcctNum;
        acct_bal := acct_rec.acct_balance;
        for txn_rec in TXN_CUR loop
            acct_bal := acct_bal + txn_rec.Amt;
        end loop;
        UPDATE Accts set acct_balance = acct_bal
            where AcctNum = acct_num;
    end loop;
end;

FIG. 13

Set Level Operation

UPDATE Accts set acct_balance = acct_balance + Txn_Sum.total_amt

FROM (
    select AcctNum, SUM(Amt) from Acct_Transactions
    group by 2
) Txn_Sum ( acct, total_Amt )

WHERE Accts.AcctNum = Txn_Sum.acct

FIG. 14

SET-LEVEL DATABASE ACCESS FOR PERFORMING ROW-SEQUENTIAL OPERATIONS

TECHNICAL FIELD

The invention relates to database systems and, in particular, to set-level database access for row-sequential operation.

BACKGROUND

Conventional database systems store data in the form of records or rows. Each row includes one or more related items of information. For example, a row can include the date, number, amount and customer for an order. Certain groups of rows are organized into tables. For example, an Orders table can include all of the rows describing the characteristics of orders that have been received.

Users of database systems manipulate and extract information from the tables and rows that make up the system. Such requests are conventionally referred to as queries. Queries can range in complexity from a request for the display of the information in a particular row to an accumulation of data regarding rows and tables that comprise terabytes of information. Users of database systems also insert, delete, and update the information stored in the tables and rows.

Database systems that employ parallel processing can manipulate and extract information from multiple rows and tables at the same time. Such systems can also insert, delete, and update multiple rows and tables at the same time. Queries and other database system operations that only address a single row at a time do not take advantage of the abilities of parallel processing.

SUMMARY

In general, in one aspect, the invention features a method for increasing the efficiency of a row sequential database operation by transforming procedural logic, which applies serially to one row at a time, into set logic, which applies in parallel to many rows or all rows at once. The method includes dividing the row sequential operation into a plurality of portions. A hierarchy among the portions is then determined. Based at least in part on the hierarchy of portions, a set level operation is generated.

Implementations of the invention may include one or more of the following. A set level operation is generated that corresponds to a the row sequential operation that includes at least one IF . . . THEN . . . ELSE statement based on a condition. The generated set level operation includes a WHERE statement based on that condition. Another implementation includes levels in the hierarchy among the portions of the row sequential operation and as each of any assignment statements are located they are associated with one of the levels.

In general, in another aspect, the invention features a method for increasing the efficiency of a row sequential database operation by transforming procedural logic, which applies serially to one row at a time, into set logic, which applies in parallel to many rows or all rows at once. The method includes analyzing the row sequential database operation. The analyzed row sequential database operation is then translated and the result is optimized to produce a set level operation.

In general, in another aspect, the invention features a computer program, stored on a tangible storage medium, for use in increasing the efficiency of a row sequential database operation by transforming procedural logic, which applies serially to one row at a time, into set logic, which applies in parallel to many rows or all rows at once, the program including executable instructions that cause a computer to divide the row sequential operation into a plurality of portions. The computer then determines a hierarchy among the portions. The computer generates a set level operation in accordance with the portion hierarchy.

BRIEF DESCRIPTION OF THE DRAWINGS

FIG. 8 is a table of function translations.

FIG. 9 is a example of a row sequential database operation.

FIG. 10 is an example of a set-level database access operation corresponding to the row sequential database operation of FIG. 9.

FIG. 11 is a example of a row sequential database operation.

FIG. 12 is an example of a set-level database access operation corresponding to the row sequential database operation of FIG. 11.

FIG. 13 is a example of a row sequential database operation.

FIG. 14 is an example of a set-level database access operation corresponding to the row sequential database operation of FIG. 13.

DETAILED DESCRIPTION

A database operation optimization technique operates by translating a row sequential database operation to a set level database operation. Hierarchical relationships between portions of the row sequential database operation are identified. The functions are then translated based on the hierarchy.

Figure 1:
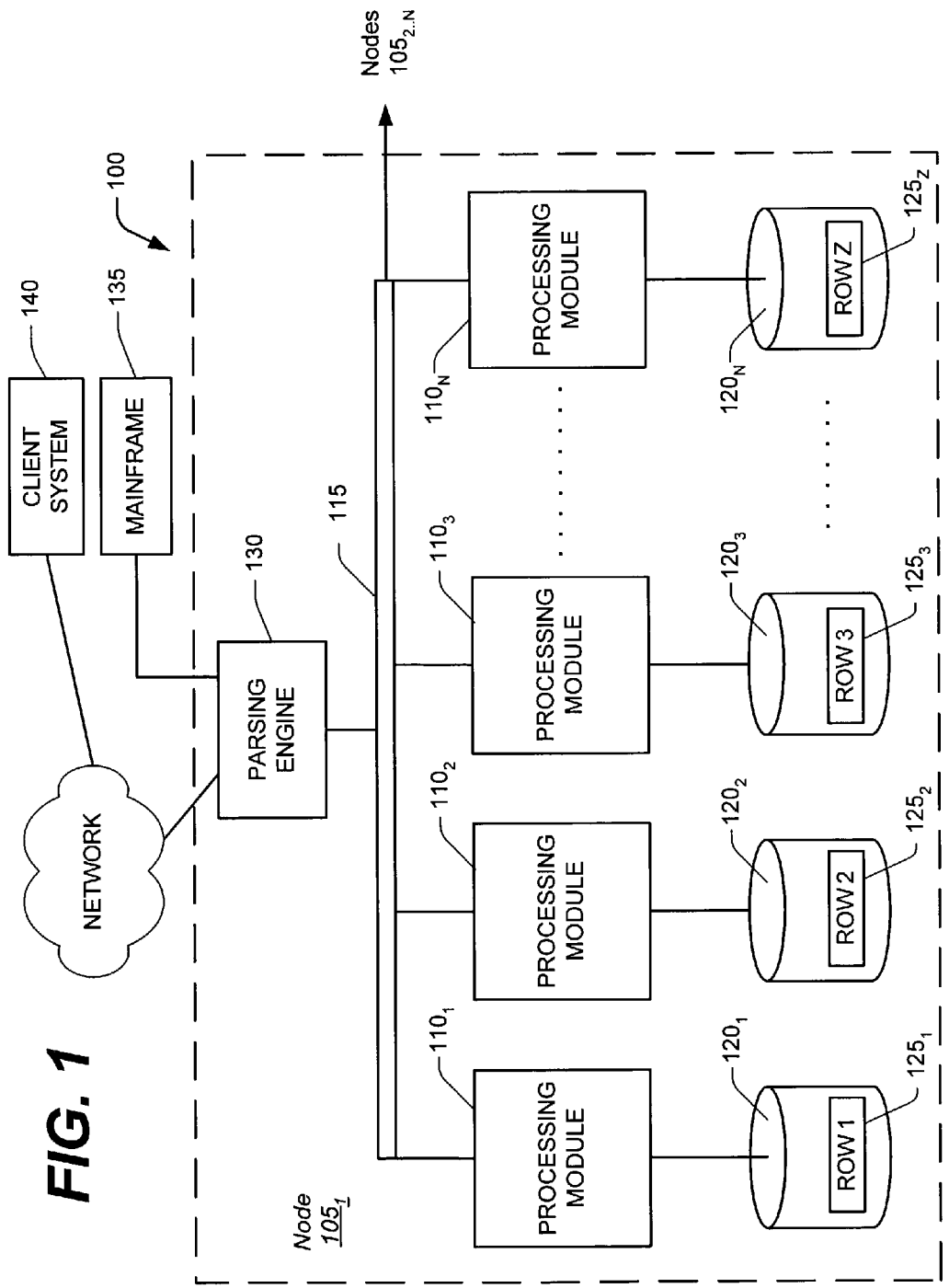
FIG. 1 is a block diagram of a node of a parallel processing database system.

The database operation optimization technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
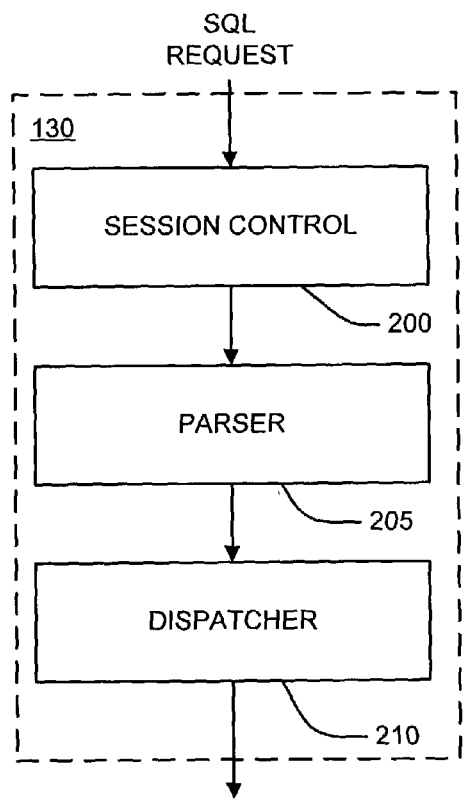
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
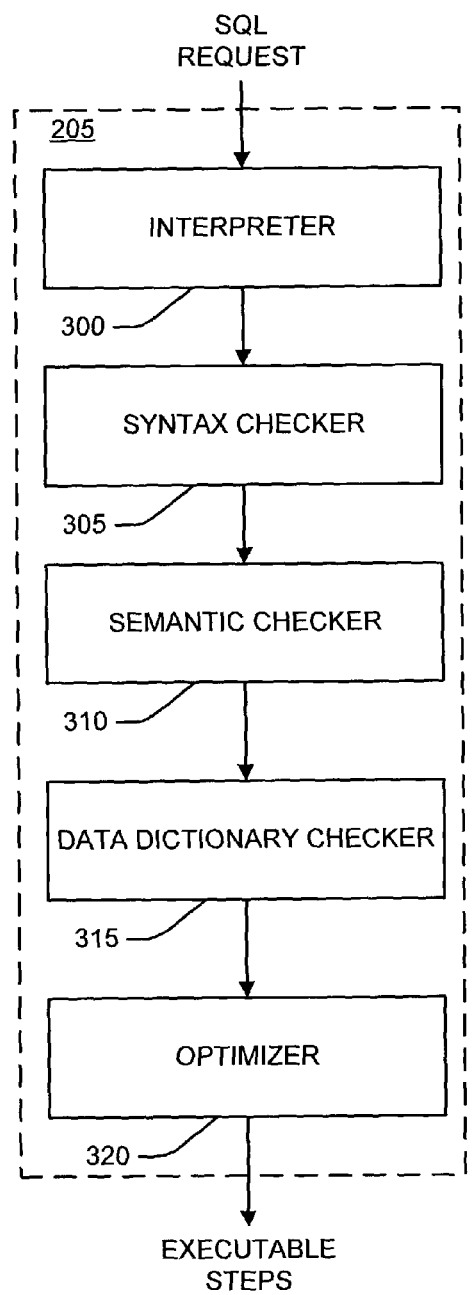
FIG. 3 is a flow chart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

The optimizer 320 can develop plans based on the extent to which the SQL request is submitted in set level format. If the SQL request is submitted in a row sequential format, the optimizer will be less able to divide the execution of the request among the to data-storage facilities $120_{1 \ldots N}$ and associated processing modules $110_{1 \ldots N}$.

Figure 4:
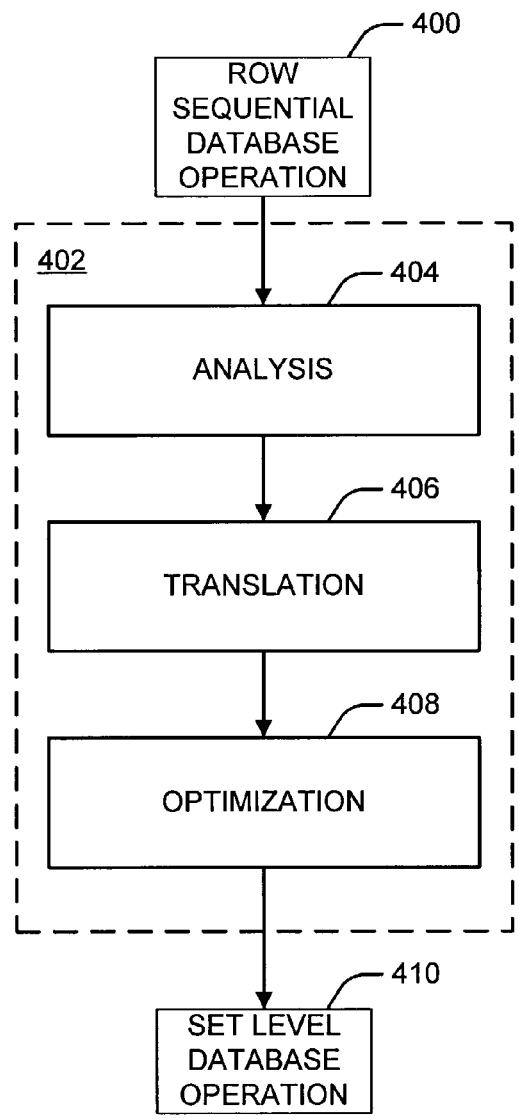
FIG. 4 is a flow chart for a method of set-level database access.

FIG. 4 is a flow chart depicting an implementation of a method for generating a set level operation from a row sequential operation. The row sequential database operation 400 is the input to the method 402. A row sequential operation 400 can be defined by Procedural Logic or PL/SQL. For example, Oracle Extract, Cleansing, Transformation, and Load (ECTL) processes use PL/SQL. Equivalent set level operations be efficiently used on a database system that employs parallel processing. The method 402 of generating an equivalent set level operation includes three different steps.

The first step of the method 402 is analysis 404. The details of analysis 404 of a row sequential operation are shown in more detail in FIG. 5. The second step of the method 402 is translation 406. The details of translation 406 of an analyzed row sequential operation are shown in more detail in FIG. 6. The third step of the method 402 is optimization 408. The details of optimization 408 of an analyzed and translated row sequential operation are shown in more detail in FIG. 7. The output of the optimization 408 is a set level database operation 410.

Figure 5:
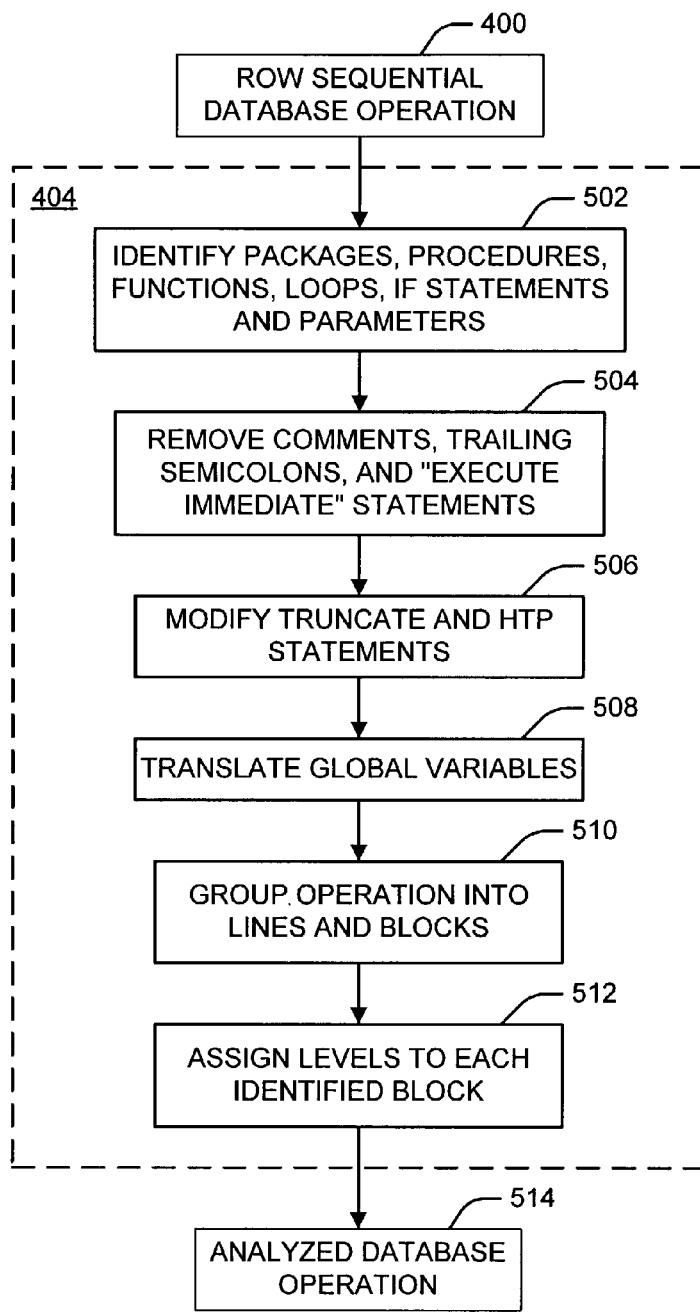
FIG. 5 is a flow chart of a method for analyzing row sequential database operations.

FIG. 5 is a flow chart depicting the analysis 404 of a row sequential database operation 400. Various portions of the operation definition are identified 502, including packages, procedures, functions, loops, IF statements, and parameters. Various portions of operation definition are removed 504, including comments, trailing semicolons, and EXECUTE IMMEDIATE statements. The analysis 404 changes "truncate table" to "delete from" and, for help in processing scripts that write to web pages with HTP. calls, it also changes "htp.*data( )" to "insert into htp.*data values( )," and similarly for "htp.*header( )." 506 Global variables are translated 508. For example, if the definition of a row sequential operation to be used with Oracle includes the global variable sysdate, the global variable DATE is substituted.

The operation definition is grouped into lines and blocks 510. In one implementation, a line is identified as any string that is terminated by a ";" or "then" or "loop" or "begin". In one implementation, a block begins with one of the following key words: package, procedure, and function. In one implementation a block begins with the word following then, loop, begin, and else. A block ends with a line that starts with the word "end," such as "end if;", "end loop;" or simply "end;". A block can also end with the word "else" or "elseif". Every block is also assigned a level number 512. For example, the block between an "if . . . then" line and an "else" line is one level higher than the block containing the if and else. In this way, a hierarchy of logical conditions is formed. An analyzed row sequential database operation 514 is output.

Figure 6:
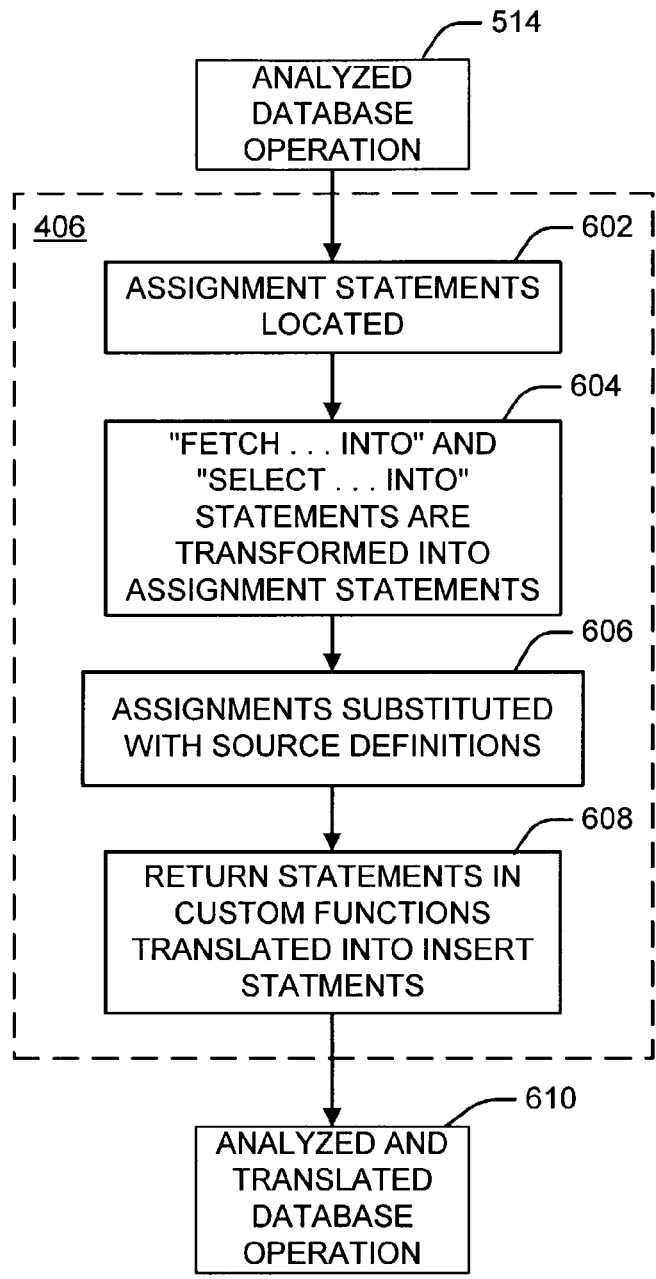
FIG. 6 is a flow chart of a method for translating analyzed database operations.

FIG. 6 is a flow chart depicting the translation 406 of an analyzed row sequential database operation 512. The operation definition is scanned to locate assignment statements 602.

In one implementation, each ":=" assignment operator is moved to the beginning of the line to simplify the next scan, so that "a :=b+c" becomes ":=a b+c". During translation, "fetch . . . into" statements and "select . . . into" statements are transformed into assignment-like statements, the first word being ":=" 604. Assignment substitutions are also performed 606. For example, if ":=a b+c" is specified at one point, a subsequent ":=d a+e" becomes ":=d b+c+d". Also, if ":=a a+b" is specified within a loop, this becomes ":=a SUM b" (to indicate that a is the sum of the b's). In one implementation, all variables are substituted with their source definitions, if possible, otherwise they are indicated as host variables with a preceding ":". User-defined functions are modified with the RETURN statement translated into an "insert into functionname__RETURN . . . " 608. The insert is also translated. The result of the translation 406 is an analyzed and translated row sequential database operation 610.

Figure 7:
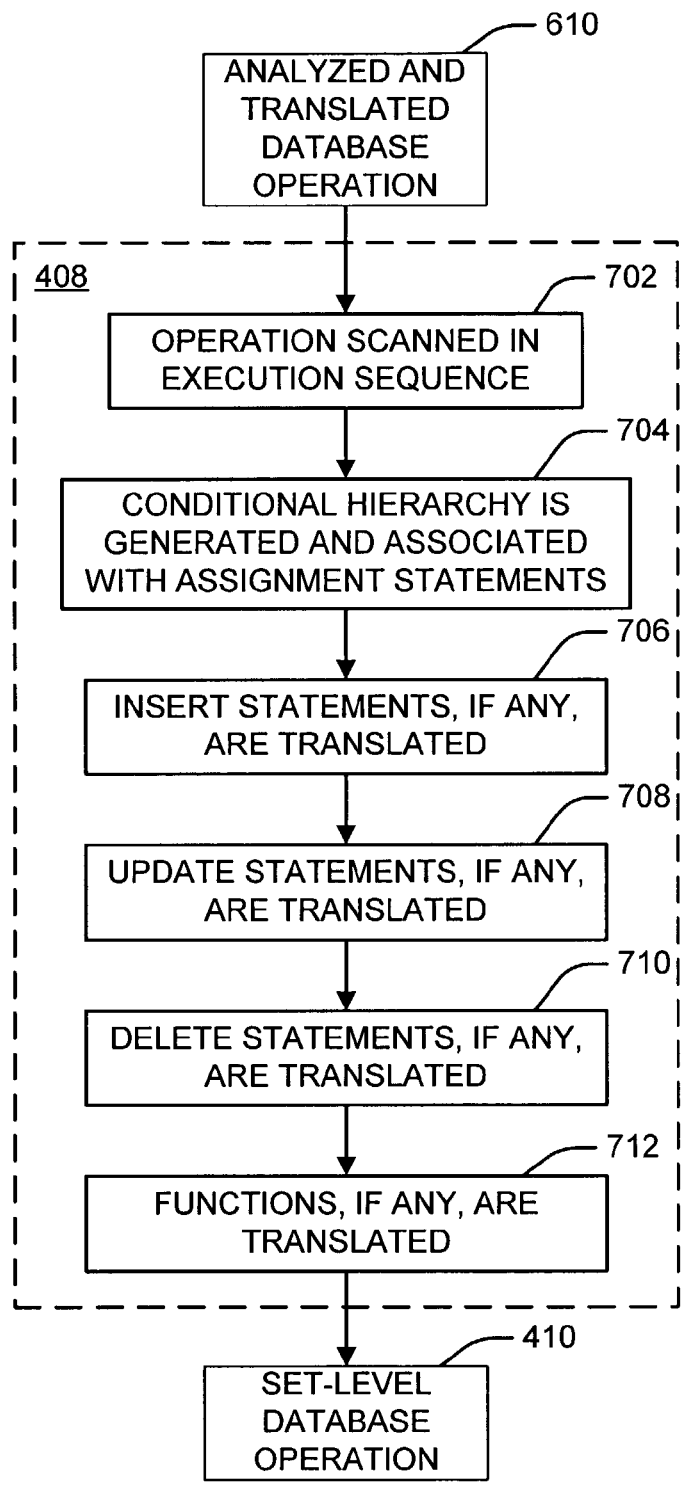
FIG. 7 is a flow chart of a method for optimizing analyzed and translated database operations.

FIG. 7 is a flow chart depicting the optimization 408 of an analyzed and translated row sequential database operation 610. The operation definition is scanned in execution sequence 702. For example, a subprocedure is not scanned until it is invoked by the parent procedure. Procedure parameters are treated as host variables. A conditional hierarchy is generated and associated with assignment statements 704. For example, IF statements are stored hierarchically until an assignment statements is found; each assignment statement is associated with this conditional hierarchy for later translation to a CASE operation or WHERE clause. The condition of an IF statement can be incorporated into a WHERE statement. For example, "IF order>10 then { ... }" becomes "WHERE (order>10) { ... }".

The next three steps translate insert 706, update 708, and delete 710 statements to the extent they are found in the analyzed and translated row sequential operation. When an insert or update or delete statement is located, all the values and predicates in that statement are translated according to their associated substitutions and conditions. Whenever one of these assignments is found to have originated in a cursor, that cursor becomes one of the objects in the FROM part of the insert-select. A cursor is a definition of a set of rows from which rows are drawn sequentially. If an assignment is not associated with a cursor, it will appear as a host variable (i.e., preceded by a colon (:)). Each select-statement that is not associated with a cursor loop is also translated.

The final step translates row sequential functions, for example Oracle functions, to set level functions, for example Teradata functions 712. Nested row sequential functions are translated into nested set level functions. A more detailed implementation of function translation is depicted in FIG. 8. For example, the nested row sequential function "decode(A, 'B',nvl(C,''),'')" becomes the nested set level function "case A when 'B' then coalesce(C,'') else '' end."

FIG. 8 depicts a first group of row sequential functions and a corresponding second group of set level functions. As shown with respect to the to_char(v,f) function, more than one set level function can correspond to a row sequential function. In some implementations, additional functions can be added to either group. In some implementations, multiple set level functions can correspond to a single row sequential function based on the inputs of the row sequential function.

FIG. 9 depicts a row sequential operation defined by PL/SQL. The cursor statements identify information (for example for a: Amt, D_date, and acct_num) that is drawn one row at a time. A loop is provided that inserts various values based on the results of conditions in IF statements. The insert into MyDeposits occurs when amount>0 for a particular row from the cursor a.

FIG. 10 depicts a set level operation define by SQL that is generated by one implementation of the disclosed method and computer program. The IF condition of amount>0 becomes a condition of the WHERE statement. The IF condition ddate is null becomes the condition of a CASE WHEN statement. The global variable sysdate is replaced by DATE. The function to_char(acct_rec.AcctNum,'9(9)') is translated to the function cast(cast(B.AcctNum as (Format '9(9)')) as char(9))). The set level operation is performed on groups of rows rather than sequential rows and is therefore more efficiently handled by a parallel processing database system.

FIG. 11 depicts a row sequential operation that is defined by a loop based on a cursor to sequentially access information in rows of the Deposits table. The loop tests the information for a single row by applying an IF ... ELSEIF ... ELSEIF ... ELSE statement and chooses an assignment statement based on the condition that is met. Finally, a row of the Gen_Ledger table is inserted by values that are based at least in part on the assignment statement that was chosen.

FIG. 12 depicts a set level operation that corresponds to the row sequential operation of FIG. 11. The definition of the set level operation includes a single INSERT statement for all the rows of the Deposits table that employs a CASE statement to equivalently implement the conditions of the IF ... ELSEIF ... ELSEIF ... ELSE statement. A parallel processing database system can insert rows stored in different data storage facilities at the same time to increase performance.

FIG. 13 depicts a row sequential operation that is defined by a loop based on a cursor to sequentially access information in rows of the Acct_Transactions table that is nested within a loop based on a cursor to sequentially access information in rows of the Accts table. The block containing the nested loop has a higher hierarchy level than the blocks containing the outside loop. The outside loop updates the Accts table. FIG. 14 depicts a set level operation corresponding to the row sequential operation of FIG. 13. The definition of the set level operation includes a single UPDATE statement that includes a FROM statement and a WHERE statement corresponding to the hierarchy of the nested loops.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for increasing the efficiency of a database operation, the method including:
    receiving a row sequential operation that includes procedural logic which applies serially to one row at a time;
    dividing the row sequential operation into a plurality of portions;
    determining a hierarchy for the portions; and
    generating a set level operation comprising set level logic which applies in parallel to many rows at once in accordance with the portion hierarchy.

2. The method of claim 1 where dividing includes:
    identifying one of a first group of words; and
    beginning a new portion with the word.

3. The method of claim 2 where dividing includes:
    identifying one of a second group of words; and
    ending a portion with the word.

4. The method of claim 1 where the row sequential operation includes cursor definitions.

5. The method of claim 1 further comprising the step of:
    translating global variables.

6. The method of claim 1 where the row sequential operation includes at least one IF ... THEN ... ELSE statement based on a condition and the set level operation includes a WHERE statement based on the condition.

7. The method of claim 1 where the row sequential operation includes at least one IF ... ELSEIF ... ELSE statement based on at least a first condition and a second condition and the set level operation includes a CASE statement based on the first and second conditions.

8. The method of claim 1 where generating includes:
    for each function the row specific operation includes from a first specified group of functions, including a corresponding function from a second specified group of functions in the set level operation.

9. The method of claim 1 wherein the hierarchy include levels and further comprising the steps of:
    identifying assignment statements in the row sequential operation; and
    associating each assignment statement with a level in the hierarchy.

10. A computer program, stored on a tangible storage medium, for use in increasing the efficiency of a database operation, the program including executable instructions that cause a computer to:
- receive a row sequential operation that includes procedural logic which applies serially to one row at a time;
- divide the row sequential operation into a plurality of portions;
- determine a hierarchy for the portions; and
- generate a set level operation comprising set level logic which applies in parallel to many rows at once in accordance with the portion hierarchy.

11. The computer program of claim 10 where, when dividing, the computer:
- identifies one of a first group of words; and
- begins a new portion with the word.

12. The computer program of claim 11 where, when dividing, the computer:
- identifies one of a second group of words; and
- ends a portion with the word.

13. The computer program of claim 10 where the row sequential operation includes cursor definitions.

14. The computer program of claim 10 where the program further includes executable instructions that cause a computer to translate global variables.

15. The computer program of claim 10 where the row sequential operation includes at least one IF . . . THEN . . . ELSE statement based on a condition and the set level operation includes a WHERE statement based on the condition.

16. The computer program of claim 10 where the row sequential operation includes at least one IF . . . ELSEIF . . . ELSE statement based on at least a first condition and a second condition and the set level operation includes a CASE statement based on the first and second conditions.

17. The computer program of claim 10 where, when generating, the computer:
- for each function the row specific operation includes from a first specified group of functions, includes a corresponding function from a second specified group of functions in the set level operation.

18. The computer program of claim 10 where the hierarchy include levels and the program further includes executable instructions that cause a computer to:
- identify assignment statements in the row sequential operation; and
- associate each assignment statement with a level in the hierarchy.

19. A computer-implemented method for increasing the efficiency of a database operation, the method including:
- receiving a row sequential database operation that includes procedural logic which applies serially to one row at a time;
- analyzing the row sequential database operation;
- translating the analyzed row sequential database operation; and
- optimizing the translated and analyzed row sequential database operation to produce a set level operation comprising set level logic which applies in parallel to many rows at once.

20. The method of claim 19 where analyzing includes: translating global variables.

21. The method of claim 19 where analyzing includes: dividing the row sequential operation into lines and blocks.

22. The method of claim 19 where translating includes: modifying assignments to include source definitions.

23. The method of claim 19 where translating includes: modifying assignments to identify host variables.

24. The method of claim 19 where translating includes: substituting ASSIGNMENT statements for FETCH . . . INTO statements.

25. The method of claim 19 where translating includes: substituting ASSIGNMENT statements for SELECT . . . INTO statements.

26. The method of claim 19 where optimizing includes: scanning the translated and analyzed row sequential database operation in execution sequence.

27. The method of claim 19 where optimizing includes: substituting WHERE statements for IF statements.

28. The method of claim 19 where optimizing includes: substituting CASE statements for IF statements.

* * * * *